June 25, 1968

E. A. MEYER 3,389,526

MOLDING ASSEMBLY

Filed Aug. 29, 1966

INVENTOR
ENGELBERT A. MEYER
BY

*Burton & Parker*

ATTORNEYS

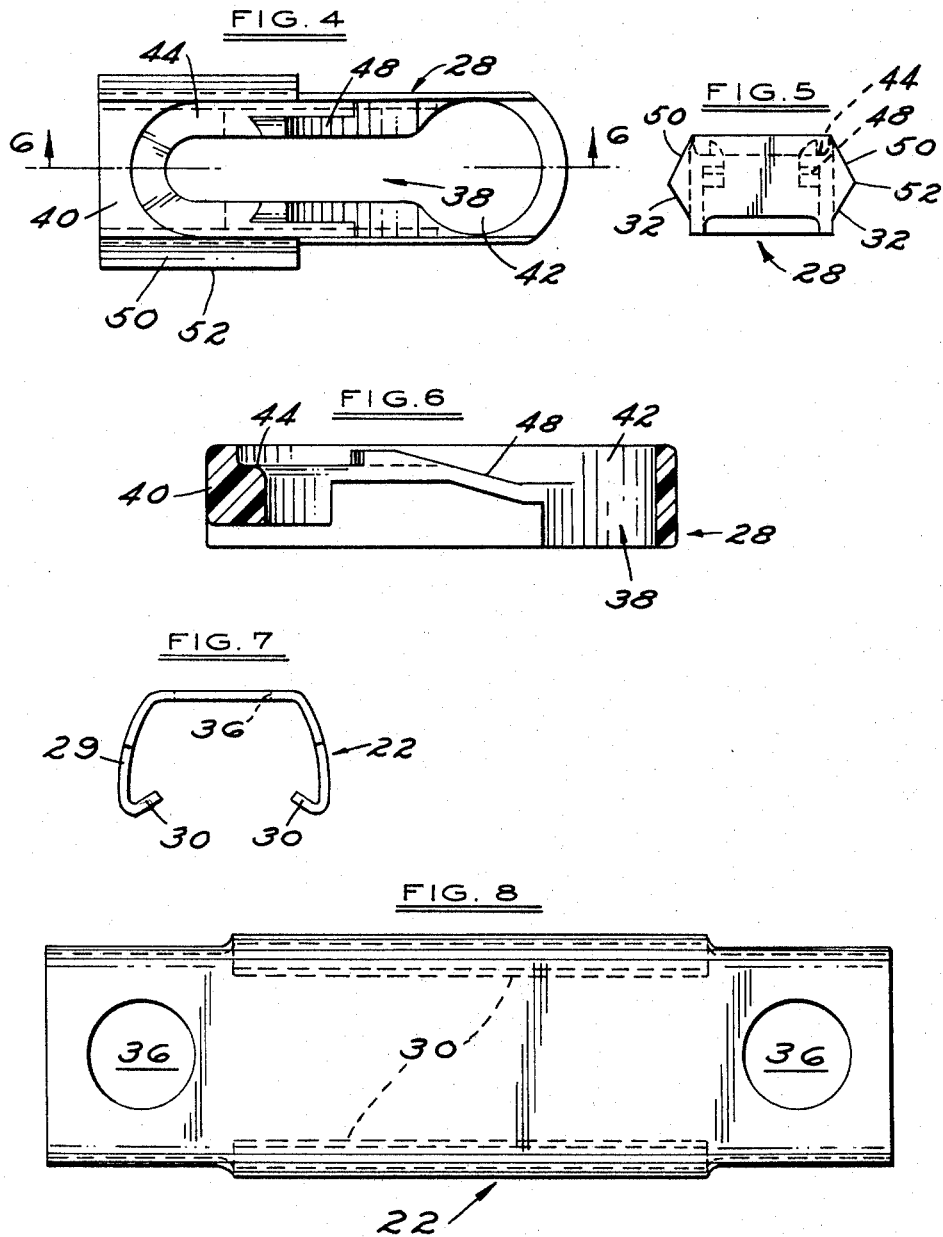

United States Patent Office 3,389,526
Patented June 25, 1968

3,389,526
MOLDING ASSEMBLY
Engelbert A. Meyer, Union Lake, Mich., assignor to Warren Fastener Corporation, Mount Clemens, Mich., a corporation of Michigan
Filed Aug. 29, 1966, Ser. No. 576,513
7 Claims. (Cl. 52—718)

ABSTRACT OF THE DISCLOSURE

This disclosure relates to a molding assembly, including a support having a button extending therefrom, an adapter releasably retained on the support by the button, a retainer in the form of an inverted U-shaped channel having inturned flanges tensioned beneath the opposed side walls of the adapter, and a longitudinal molding device received over the retainer and secured thereto.

This invention relates to an improved molding assembly. More particularly, this invention relates to an improved molding assembly for a hollow molding device which is secured in overlying relation to a support. This invention is particularly, although not exclusively, adapted to secure a rigid molding device, such as a die cast molding, to a support.

Molding devices are used in the manufacture of automobiles, refrigerators, and the like to meet functional and design requirements. Rigid, or die cast moldings are used in relatively small volume applications, such as limited edition or luxury automobiles, where the expense of tooling does not justify the use of more conventional resilient stamped molding devices.

Preferably, the button is attached to the support in accordance with the methods described in United States Letters Patent 3,153,468, assigned to the assignee of the instant application, wherein the button is welded to steel, or adhesively secured to various materials including steel, thereby eliminating the corrosion problem inherent in previously used techniques requiring a hole through the support.

Another advantage of the weld on system is the substantial reduction in storage requirements. Separate inventory of common body panels and the like, necessitated by the use of different trim, may be eliminated because the buttons are welded on in the automotive assembly line. A series of spaced buttons for a single longitudinal molding device may be applied in a gang operation with accurate alignment.

The button of the weld on system is small, when compared to previously employed fasteners in the automotive trim field. A suitable size button, presently used in the mass production of automobiles, involves a button which is 0.200 inch in diameter at its head, 0.160 inch in height; the shank of the button being slightly greater than one half the diameter of the head. Utilization of the weld on faster system has already produced substantial economies in the automotive field. Similar economies and advantages are obtained in other fields, such as appliances, refrigerators, stoves and the like.

The instant application will be described in the context of an automotive molding assembly.

The molding assembly of this invention was designed to meet the particular problem of attaching a relatively cumbersome rigid or die cast molding in overlying relation to a support, such as automotive body panel. However, the structure developed may be used to advantage in the more conventional stamped molding, for example.

Another object of this invention was to provide a molding assembly, which could be utilized to secure a rigid or die cast molding, wherein the molding could be adjusted longitudinally, without secrificing requisite rigidity or stability. The inherent dangers involved in a loose molding or one which may be jarred loose from the automobile body should be apparent to those skilled in the art, and this is especially true of the heavier die cast molding.

Another object of this invention is the utilization of the commercially successful weld on system, described briefly herein, in a rigid die cast molding assembly.

A problem in the design of an assembly which meets these requirements results from the fact that the button of the weld on fastener assembly is attached prior to the adaptor and the trim, and the relatively small button, which may be characterized as BB shot size.

Summary of the invention

The molding assembly of this invention includes a hollow molding device, such as a die cast molding, having a retainer secured therein, a support, such as an automotive body panel, a weld on fastener button secured to the outer surface of the support, and an adaptor releasably retained on the button having side walls overlying the support. The retainer may be formed of sheet metal into an inverted U-shaped longitudinal channel, having inturned flanges which are received beneath, and tensioned against the overhanging side walls of the adaptor. The side walls of the adaptor extend generally parallel to the axis of the retainer to permit longitudinal adjustment of the die cast molding. The adaptor may be relatively narrow, when compared to previously used adaptors of the weld on system, because of the restricted space available in the die cast molding assembly, and the added weight of a die cast molding. The adaptor is provided with a key hole slot and the body portion has a ramp defined adjacent the key hole slot which tensions the adaptor against the support when the button is received on a button seat defined opposite the enlarged opening of the key hole slot.

On the assembly line, the adaptor is connected to a button secured to the support by receiving the enlarged opening of the key hole slot over the button. The adaptor is then shifted to seat the button on the button seat, which frictionally seats the adaptor on the automotive panel as described hereinabove. The opposed inturned flanges of the retainer may then be snapped over the overhanging side walls of the adaptor, which firmly seats the molding on the adaptor. In this embodiment of the molding assembly, the sheet metal retainer is spaced from the plane of the support to prevent contact of the dissimilar metals.

The above-described assembly provides a reliable and relatively inexpensive means of securing a hollow molding device over a support, which is not subject to corrosion, and which may be longitudinally aligned after securement.

Other objects, advantages, and meritorious features will more fully appear from the following specification, claims, and accompanying drawings, wherein:

FIGURE 4 is a top elevation of the adaptor utilized in the assembly of FIGURE 1;

FIGURE 5 is an end view of the adaptor shown in FIGURE 4;

FIGURE 6 is a cross sectional view of the adaptor shown in FIGURE 4 in the direction of view arrows 6—6;

FIGURE 7 is an end view of the retainer utilized in the assembly of FIGURE 1; and FIGURE 8 is a top elevation of the retainer shown in FIGURE 7.

Figure 1:
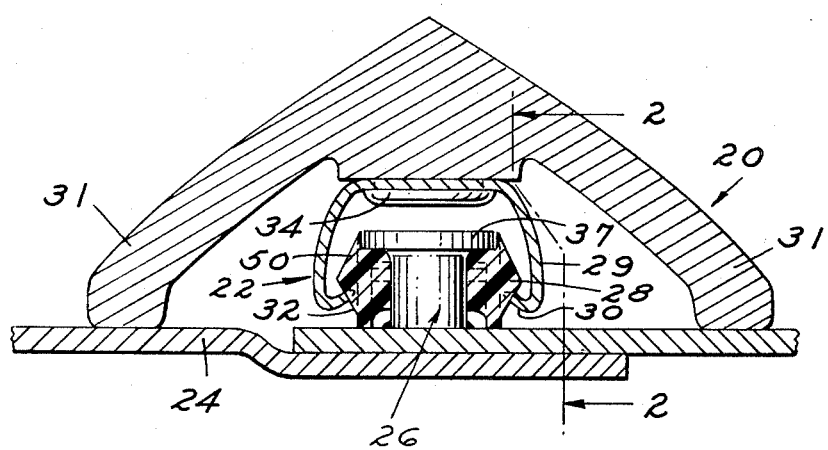
FIGURE 1 is a cross sectional view of the molding assembly of this invention.
Figure 2:
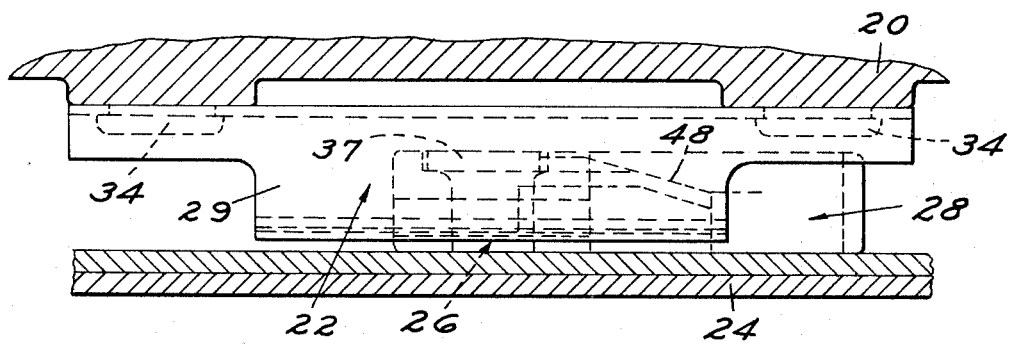
FIGURE 2 is a cross sectional view of the assembly shown in FIGURE 1 in the direction of view arrows 2—2.
Figure 3:
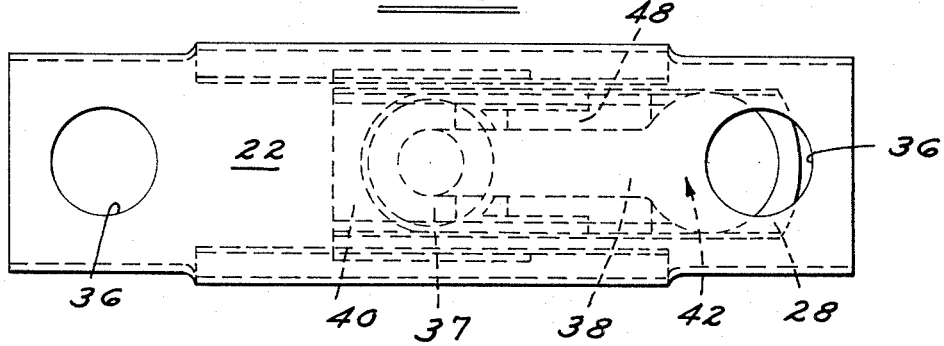
FIGURE 3 is a top elevation of the assembly shown in FIGURE 1 without the molding.

In FIGURES 1 to 3, I show one embodiment of the molding assembly of the invention, and in FIGURES 4 to 8 I show details of the adaptor and retainer utilized in the assembly. The molding assembly comprises a longitudinal hollow molding device 20 having a retainer 22 secured therein, a support 24 having a button 26 secured to the outer surface thereof, and an adaptor 28 interconnecting the button to the molding retainer 22. The retainer, see FIGURES 7 and 8, is formed of sheet material into an inverted U-shaped longitudinal channel having side walls 29 terminating in inturned flanges 30 adapted to be received beneath and tensioned against downwardly facing surfaces 32 of the adaptor.

The molding 20 in this embodiment may be rigid, as a die casting or the like. The molding is hollow, and is provided with a pair of downwardly extending arms 31 which engage the surface of the support 24. In this embodiment, the molding is provided with a pair of integrally cast lugs 34 which extend through apertures 36 in the retainer and are secured in place as by staking, peening, or the like.

The support 24, which may be an automotive body panel, refrigerator housing, or the like, is illustrated in FIGURES 1 and 2 as a pair of lap-welded panels to show the versatility of this assembly and one function of the molding 20. The button 26 has an enlarged head 37 spaced from the plane of the support, and may be welded or adhesively bonded to the support in accordance with my above-referenced United States Letters Patent.

The adaptor 28, see FIGURES 4 to 6, has a key hole slot 38 defined therein, and a generally rectangular body portion 40. In assembly, the enlarged opening 42 of the key hole slot is received over the button 26, and the adaptor is shifted to seat the button on a button seat 44 defined at substantially the geometric center of the rectangular body portion 40. The adaptor is provided with an inclined ramp 48 adjacent either side of the key hole slot which biases the adaptor toward the support as the button is shifted to seat the button on the button seat 44. The rectangular body portion 40 of the adaptor is generally diamond shaped in cross section, as shown in FIGURE 1, with generally downwardly facing surfaces 32 which receive and retain the inwardly turned flanges 30 of the retainer, and generally upwardly facing sloping surfaces 50 which expand the flanges of the retainer, under pressing engagement, past the vertical side wall 52.

The molding assembly elements have been designed to eliminate the necessity of retaining the molding device 20 adjacent the ends of the downwardly extending arms 31, while retaining the requisite stability and rigidity of the assembly. The more conventional stamped molding device is provided with inturned flanges, which may receive the arms of a retainer secured to a weld on fastener button, or which may be received directly on an adaptor. The problem is compounded when a die cast molding device is to be utilized, because of its added weight and thickness.

In this embodiment, a relatively narrow plastic adaptor is used, with a substantially rigid rectangular body portion 40, which receives the retainer flanges 30. The button seat is defined at substantially the geometric center of the rectangular adaptor body, and the inturned flanges 30 of the retainer bite into the downwardly facing sloping adaptor surfaces 32. The U-shaped channel of the retainer is narrow, when compared to even conventional molding channels, to add stability and rigidity. Thus, the design of this adaptor enables the securement of a rigid molding device without sacrificing safety requirements.

Another aspect of the design of this molding assembly is the longitudinal adjustability of the molding device, not present in conventional rigid or die cast molding assemblies. In this embodiment, the downwardly facing side walls 32 of the adaptor extend longitudinally generally parallel to the axis of the molding retainer 22, allowing the molding 20 to be longitudinally adjusted after assembly.

Various materials are used for all parts of the molding assembly, while the automotive industry utilizes metal primarily for the automotive support, the molding device, and the retainer. Steel is used primarily for the automotive support, with stainless steel being used for the button as well as cold rolled zinc plated steel. The retainer may be formed from sheet steel stock, and the molding device may be steel, or zinc or aluminum cast. The buttons in present automotive applications are stud welded to a prefabricated metal support, before painting, or at least before final finishing, in a predetermined orientation. After cleaning, coating, and polishing, the automotive support is ready to receive the adaptor. Preferably, the adaptor is made of a non-metallic resilient material to aid in the biting action of the retainer, provide the resiliency required for the assembly, and to provide an electrolytic corrosion barrier between dissimilar metal parts. A suitable material for the adaptor is a thermoplastic resin, such as fiber filled nylon, polycarbonates, acetal resins, and polypropylene.

While the molding assembly adaptor, retainer and button have been described with reference to certain configurations and arrangement of elements, it is understood by those skilled in the art that various modifications may be made to the embodiment disclosed without departing from the purview of the appended claims, or the invention as disclosed herein. For example, the molding device need not be die cast, as shown, as the assembly was designed to eliminate retention of the molding device adjacent the ends of the downwardly extending arms, and may be advantageously utilized in other rigid molding devices or even resilient molding channels without departing from the purview of the appended claims.

What is claimed is:

1. A molding assembly, comprising: a hollow molding device having a retainer secured therein, a support having a button secured to the outer surface thereof having a head portion spaced from the plane of the support, and an adaptor of substantially the same width as said buttonhead releasably retained beneath said button head having side walls overlying said support generally parallel to the axis of said retainer to permit longitudinal adjustment of said molding device, said retainer formed of sheet metal material into an inverted U-shaped longitudinal channel having inturned flanges received beneath said side walls of said adaptor and tensioned there against in spaced relation to said support, and said retainer having an axial length greater than the length of said side walls of the adapter to permit adjustment in the common axis.

2. The molding assembly defined in claim 1, characterized in that said hollow molding is die cast.

3. The molding assembly defined in claim 2, characterized in that said hollow molding device has a pair of spaced lugs which extend through apertures in said retainer having enlarged head portions which retain said die cast molding to said retainer.

4. The molding assembly defined in claim 3, characterized in that said molding lugs are integrally cast on said molding.

5. The molding assembly defined in claim 1, characterized in that said adaptor is made of a thermoplastic material, and said retainer is made of sheet metal, thereby providing a gripping retention of said inturned flanges on said adaptor.

6. The molding assembly defined in claim 1, characterized in that said side walls of said adaptor are defined on a substantially rectangular body portion of said adaptor, and the said button is seated on a button seat defined at substantially the geometric center of said rectangular body portion.

7. The molding assembly defined in claim 6, characterized in that said rectangular body portion has a pair of spaced longitudinal base portions tensioned against said support, and said inturned flanges of said retainer are spaced from the plane of said support.

References Cited

UNITED STATES PATENTS

| 2,327,328 | 8/1943 | Murphy | 52—717 |
| 2,347,863 | 5/1944 | Woodward | 24—259 |
| 3,222,838 | 12/1965 | Sweeney | 52—717 |
| 3,239,988 | 3/1966 | Meyer | 52—718 |
| 3,246,440 | 4/1966 | Meyer | 52—718 |
| 3,248,995 | 5/1966 | Meyer | 52—718 |

FRANCIS K. ZUGEL, *Primary Examiner.*